United States Patent
Osborn et al.

(10) Patent No.: US 12,260,395 B2
(45) Date of Patent: Mar. 25, 2025

(54) CARD WITH FIELD STRENGTH VISUALIZATION DISPLAY

(71) Applicant: Capital One Services, LLC, McLean, VA (US)

(72) Inventors: Kevin Osborn, Newton Highlands, MA (US); David Kelly Wurmfeld, Palm Bay, FL (US); Bryant Yee, Silver Spring, MD (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 17/903,400

(22) Filed: Sep. 6, 2022

(65) Prior Publication Data

US 2024/0078533 A1    Mar. 7, 2024

(51) Int. Cl.
*G06K 19/07* (2006.01)
*G06K 19/077* (2006.01)
*G06Q 20/34* (2012.01)

(52) U.S. Cl.
CPC .......... *G06Q 20/357* (2013.01); *G06Q 20/352* (2013.01)

(58) Field of Classification Search
CPC ........... G06K 7/10722; G06K 7/10732; G06K 7/10693; G06K 7/1417; G06K 7/10861; G06K 7/10663; G06T 19/00; G06T 7/70;
(Continued)

(56) References Cited

U.S. PATENT DOCUMENTS

| 2005/0218377 A1* | 10/2005 | Lawandy | C09K 19/52 |
| | | | 252/299.01 |
| 2007/0059901 A1* | 3/2007 | Majumdar | H01G 11/48 |
| | | | 438/455 |

(Continued)

FOREIGN PATENT DOCUMENTS

| JP | 2009086067 A | * | 4/2009 | |
| WO | 20100105515 A | * | 9/2015 | ............. G06K 19/07 |
| WO | WO-2015135828 A1 | * | 9/2015 | ......... G06K 19/0723 |

OTHER PUBLICATIONS

Claes Goran Granqvist et al., "Electrochromics" (Year: 2006).*
Zeng, "LLC Resonant Converter Topologies and Industrial Applications—A Review*" (Year: 2020).*

*Primary Examiner* — Thien T Mai
(74) *Attorney, Agent, or Firm* — Foley & Lardner LLP (57) ABSTRACT

In some embodiments, a near-field communication card may be provided with an NFC-field-strength visualization display and a transparent window through which the NFC-field-strength visualization display is visible. In some embodiments, a token (e.g., the NFC card) may be constructed to include an electromagnetic field visualization display, a radiofrequency communication antenna, and a first transparent region having a transparent surface through which the electromagnetic field visualization display is visible. In some embodiments, a first layer of a token may be provided, where the first layer includes an electromagnetic field visualization display and a radiofrequency communication antenna. A second layer of the token may be provided, where the second layer includes a first transparent region. The first and second layers may be bonded such that the electromagnetic field visualization display of the first layer is visible through the first transparent region of the second layer.

20 Claims, 6 Drawing Sheets

(58) Field of Classification Search
CPC ........ G06T 7/50; G06T 7/20; G06T 2200/04;
G06T 2207/10028; G06T 2207/30204;
G06T 2215/06; G06T 2200/08; G06T 7/62

See application file for complete search history.

(56) References Cited

U.S. PATENT DOCUMENTS

| | | | | |
|---|---|---|---|---|
| 2008/0061152 | A1* | 3/2008 | Shingai | G06K 19/07703 235/492 |
| 2009/0159712 | A1* | 6/2009 | Mullen | G06K 7/084 235/493 |
| 2011/0279242 | A1* | 11/2011 | Krawczewicz | G06K 19/0723 340/10.6 |
| 2016/0307089 | A1* | 10/2016 | Wurmfeld | G06K 19/07707 |
| 2023/0100463 | A1* | 3/2023 | Hosotani | H02J 7/0068 235/451 |

* cited by examiner

```
┌─────────────────────────────────────────────────────────────────┐
│ Provide a first layer of a token with an electromagnetic field   │
│ visualization display and a radiofrequency communication antenna.│
│                              502                                 │
└─────────────────────────────────────────────────────────────────┘
                                 │
                                 ▼
┌─────────────────────────────────────────────────────────────────┐
│       Provide a second layer of the token with a transparent region │
│                              504                                 │
└─────────────────────────────────────────────────────────────────┘
                                 │
                                 ▼
┌─────────────────────────────────────────────────────────────────┐
│         Perform bonding of the second layer with the first layer │
│                              506                                 │
└─────────────────────────────────────────────────────────────────┘
```

FIG. 5

CARD WITH FIELD STRENGTH VISUALIZATION DISPLAY

BACKGROUND

In recent years, the propagation of near-field communication (NFC) has revolutionized payment systems. By offering a low-speed connection through inductive coupling between antennae on NFC-enabled devices, NFC allows for bidirectional communication between devices wirelessly. As a standardized subset of other radiofrequency identification (RFID) systems. NFC is a highly versatile system, as it allows for bootstrapping of many low-speed connections, such as Bluetooth file-sharing or WiFi-Direct connections, allowing for more robust short-range connectivity. In addition. NFC has also seen many use cases as a supplement to identity and access documents, such as in passports, identification cards, and transit passes, where its shorter range and encryption support meet security standards that less private RFID systems lack.

As the number of applications for NFC technologies increase, users are more likely to need to interact with NFC-enabled devices, such as identity cards, transit passes, or bank cards, at border crossings, fare-gates, or points-of-sale. A consequence of the ubiquity of NFC technology, however, is that many NFC card readers lack standard designs, which means predicting the optimal position for placing an NFC card on a reader has become increasingly difficult. While some readers have stickers or indications to aid with such placement, these aids are often inaccurate for certain cards (e.g., due to different card designs) or obstructed.

SUMMARY

Methods and systems are described herein for novel uses of and/or improvements to wireless cards or tokens. As one example, methods and systems as described herein allow a visualization of the NFC-field strength on NFC-enabled cards.

To overcome one or more of the foregoing technical deficiencies (and those described herein), methods and systems disclosed herein utilize materials that are photosensitive to electromagnetic fields in the construction of the card, for example, to enable visualization of electromagnetic fields, such as those transmitted by NFC card readers or other short-range wireless communication terminals. For example, the card includes a layer of an electromagnetic visualization display, with transparent windows such that the display is visible. Accordingly, the methods and systems allow users of NFC-enabled cards to visualize electromagnetic fields, such that users may be able to better position their cards adjacent to the wireless card readers, such as point-of-sale devices, which improves the ease and efficiency of using these cards to transmit information.

In some aspects, the manufacture of the token may include providing a first layer of a token, where the first layer includes an electromagnetic field visualization display and a radiofrequency communication antenna. The manufacture of the token may also include providing a second layer of the token, where the second layer includes a first transparent region. The manufacture of the token may also include performing bonding of the first and second layers such that the electromagnetic field visualization display of the first layer is visible through the first transparent region of the second layer.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1A:
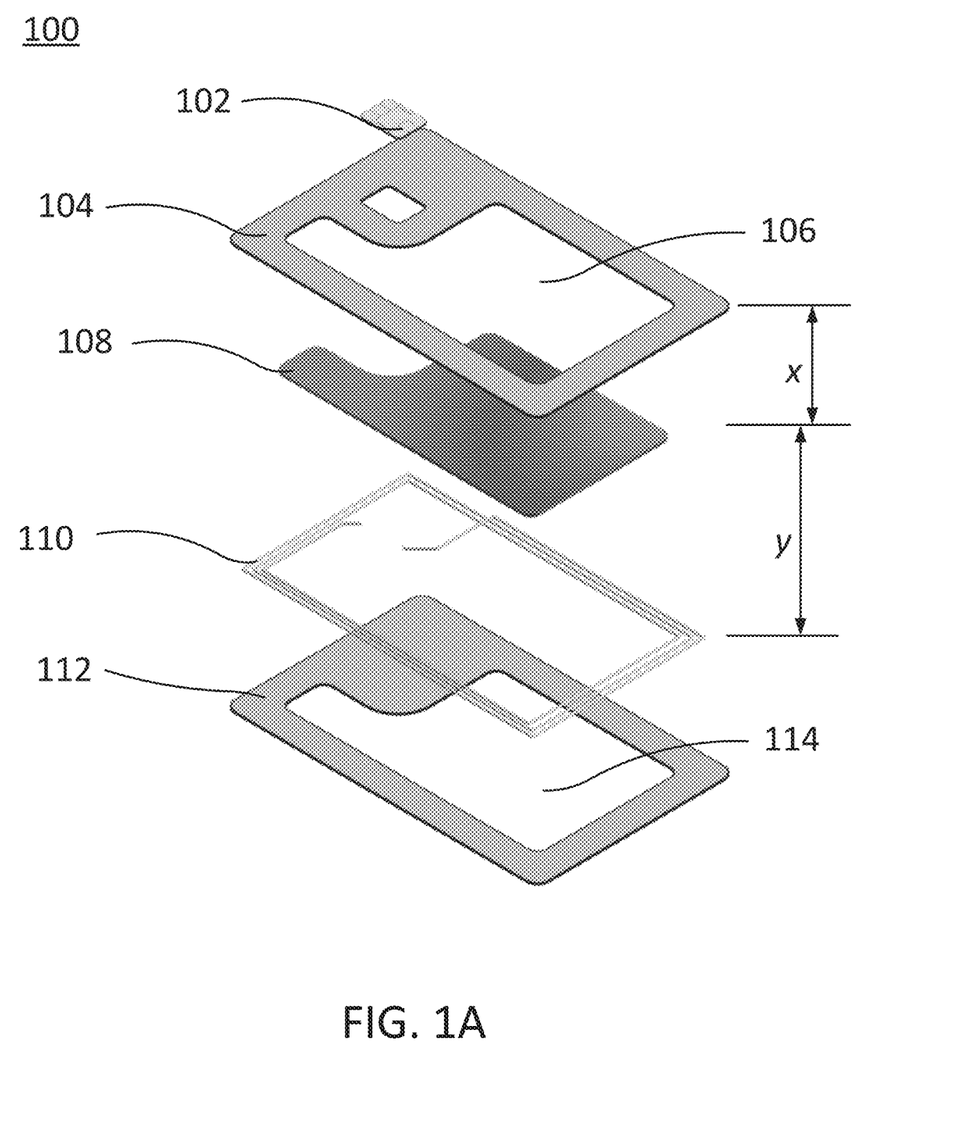
FIG. 1A shows an illustrative diagram for the layer-by-layer construction of a wireless token that allows for a visualization of electromagnetic fields, in accordance with one or more embodiments.

FIG. 1A shows an illustrative diagram for the layer-by-layer construction of a wireless token that allows for a visualization of electromagnetic fields, in accordance with one or more embodiments. For example, in some embodiments, token 100 includes a chip 102, which may include an integrated circuit for smart cards and for payment terminals or automated teller machines; these chips may adhere to EMV (Europay, Mastercard and Visa) or other smart card standards. By integrating smart integrated circuits in the structure of the token, the token may communicate with electronic payment systems, credit card networks or border security systems, for example, which broadens the applications for which the token may be used.

In some embodiments, NFC antenna coil 110 may surround layer 108, or sit below, above, or adjacent to layer 108. Token 100 may include a backing layer 112, which may include a transparent region 114 (or, in some embodiments, an opening 114) substantially similar to transparent region 106 (or, in some embodiments, an opening 106). NFC antenna coil 110 may include a tuned resonance circuit corresponding to a frequency configured to receive NFC signals, which enables NFC communications wirelessly with terminals, such as points-of-sale and transportation fare-gates. By mechanically connecting NFC antenna coil 110 with chip 102, transactions or processes controlled by chip 102 may be bootstrapped onto the signal received by or transmitted to NFC antenna coil 110. Thus, the NFC antenna coil allows for transfer of information to and from the token wirelessly by providing a physical, yet contactless, interface between the terminal and chip 102 housed in the token itself. Note that through this process, however, the token may not produce and transmit power on its own; rather, it relies on electromagnetic power transmitted externally from a terminal, for example, before processing the signal through a tuned resonant circuit and chip 102. Through magnetic induction, the processed signal creates its own signal in response, allowing a transmission back to the terminal.

Figure 1B:
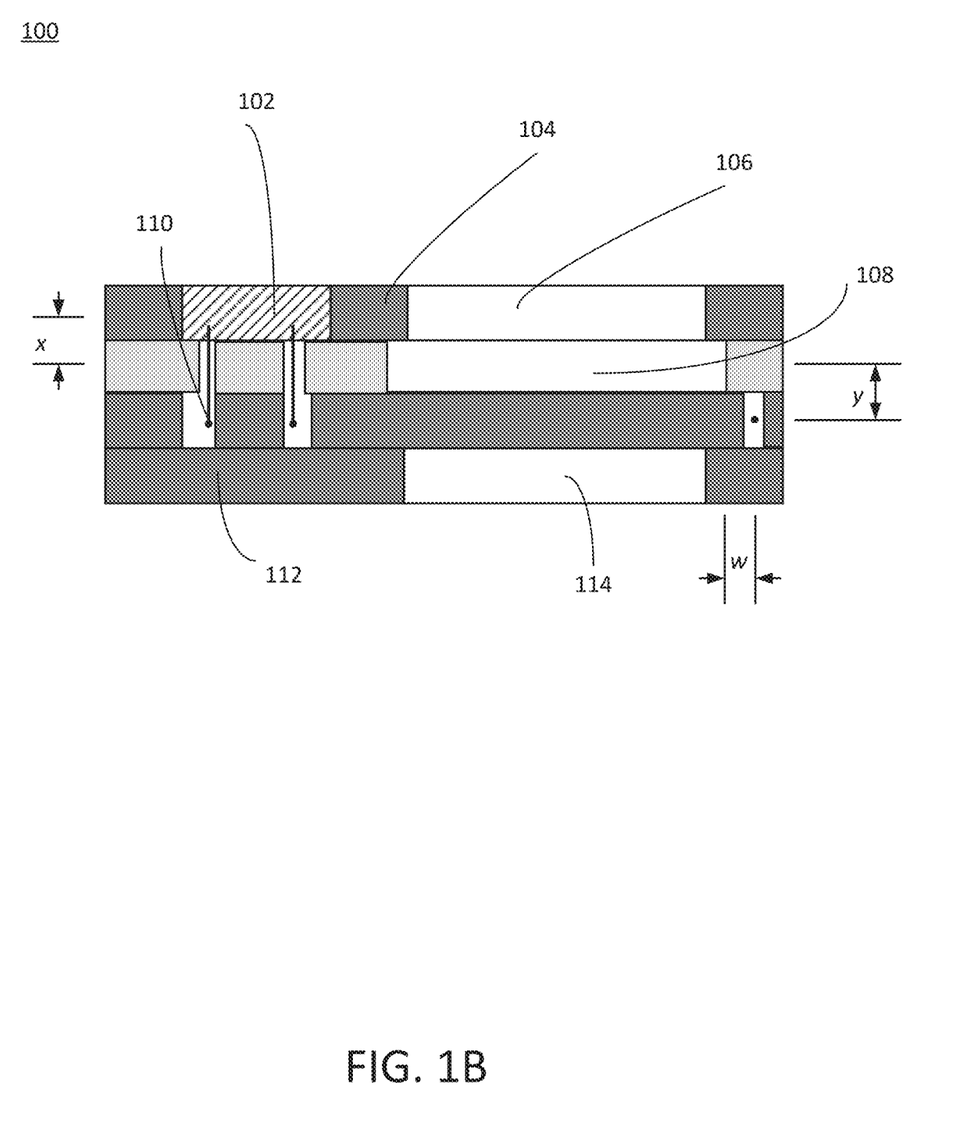
FIG. 1B shows an illustrative diagram for a cross-section of a wireless token that allows for a visualization of electromagnetic fields, in accordance with one or more embodiments.

The token may also include a layer 104 with a transparent region 106, which allows electromagnetic field visualization display 108 to be visible from on top of the card. Layer 104, and transparent region 106 may be positioned distance x from electromagnetic field visualization display 108, as shown in a cross-section of the wireless token as in FIG. 1B, where x may vary between 0 and 10 mm, in some embodiments. Controlling distance x may work to confer sufficient structural integrity to the electromagnetic field visualization display and allow display 108 to still be visible. Electromagnetic field visualization display 108 may also sit a distance y from NFC antenna coil 110, in some embodiments, where y in some cases may vary from 0 to 10 mm. Power transfer between the token and an NFC-enabled terminal, for example, may vary as the square of the distance between the token and the terminal. The signal may attenuate by around 0.8 dBm per millimeter of the token-terminal distance. As a result, in some cases, the token may only be able to interact with a terminal if it is within about 20 millimeters away. By ensuring that the NFC antenna coil sits within around 10 mm or less (e.g., 3 mm to 10 mm, or 3 mm or less) from the electromagnetic field visualization display, the token may more accurately indicate the field strength originating from the terminal may be improved. By controlling distance y, the accuracy of visualization display 108 in reflecting the electric or magnetic field strength at antenna 10 may be improved. In some embodiments, distance y may be shortened to 3 mm or less, in order to further improve the accuracy of the display. A larger distance y of up to 10 mm, on the other hand, may allow other features to be incorporated in the card between the antenna and the visualization display, such as other integrated circuits or communication mechanisms. NFC antenna coil 110, as it wraps around the token, may have components that sit a lateral distance w from the electromagnetic field visualization display 108, as shown in FIG. 1B. This lateral distance may also influence the accuracy of the display of the electromagnetic fields. By controlling this distance, also to between 0 mm and 10 mm, or to 3 mm or less in some embodiments, more precise control of the visualization of the influence of the NFC terminal's field on the coils themselves may be achievable. Note that lateral distance w between NFC antenna coil 110 and electromagnetic field visualization display 108 may be measured in any direction within the plane of the token. By including an electromagnetic field visualization display, the token may visually represent the electromagnetic power transmitted externally from the terminal, as discussed previously. Because operation of the NFC-enabled token requires optimizing power transmission from the terminal to the antenna coil, electromagnetic field visualization display 108 could then allow a user to visually perceive regions of strongest power transmitted from the terminal, allowing the user to center the token over any regions of highest electromagnetic field. As such, this construction allows a user to more efficiently locate the optimal position for the NFC card when carrying out a contactless transaction at a point-of-sale, for example, especially when any built-in position indicators are obstructed or missing. In other settings, such as in railway station fare-card terminals, these electromagnetic field visualization displays allow the token to improve information transmission from NFC-enabled fare passes to fare-gates. This improvement in this setting may even, for example, reduce bottlenecks of commuters entering or exiting railway stations.

As referred to herein, "NFC" may include a set of communication protocols known as "near-field communication" whereby communication is possible between two electronic devices over a distance of 4 cm or less. NFC is rooted in radiofrequency identification, whereby hardware, such as terminals, may supply power and communicate with otherwise unpowered tags through radio waves. NFC may utilize inductive coupling between two loop antennae in order to enable this communication. Devices that utilize NFC may be passive, where an initiator device provides a carrier field and a target device acts as a transponder, by modulating the incident field. Devices that utilize NFC may also act in an active mode, where both the initiator and target devices produce their own alternating-current fields, and must stop transmitting in order to receive data from the other.

As referred to herein, a "smart card" may include a card, token, or other instrument that acts as an electronic authorization device, in order to control access to a resource. For example, a smart card may contain identity, financial, contact, public transport or healthcare information. A smart card may contain an integrated chip, such as an EMV chip, in order to contain this information; this information may be in encrypted form. Smart cards may also include other features, such as buttons, keyboards, fingerprint sensors, buzzers, and speakers, and may be known as "complex smart cards" in these embodiments.

As referred to herein, a terminal may refer to any device that may interface with a card. As referred to herein, a "point-of-sale" or "payment terminal" may include a device that interfaces with a payment card in order to make electronic funds transfers. A payment terminal may include a keypad for entering personal identification numbers, a screen and a means for capturing information from payment cards, such as a chip-reader, an NFC transmitter and receiver, or a magnetic stripe reader. A payment terminal may be NFC-enabled, in which case it may transmit radiofrequency magnetic signals through magnetic induction in a loop coil, and may receive signals by measuring any differences in induced current through the loop coil. The payment terminal may interface with an electronic payment system, or another network.

As referred to herein, "electronic payment systems" may include a system that allows the acceptance of electronic payment. For example, an e-payment system may relate to a credit card network, and may provide an authorization service whereby card issuers can approve or decline transactions, as well as a clearing or settlement system. As referred to herein, a "credit card network" may include any system that allows the acceptance of credit cards as a method for making purchases. Electronic payment systems and credit card networks may both leverage EMV technology, as well as NFC, in order to improve communication between a user or consumer and a point-of-sale.

As referred to herein, a "fare-gate" may include any system that automates the validation of tickets, generally as related to transportation fares. A fare-gate may include a physical barrier, whereby the physical barrier may evaluate a user's credentials, such as whether they have paid for a transport ticket, and, in response, may allow a user to continue travelling. NFC technology allows for quick, efficient validation by interfacing between a transportation ticket or validation card, and the fare-gate, in a contactless, completely electronic manner, allowing for greater efficiency of fare-gate systems in transportation systems.

As referred to herein, an "EMV-enabled token" may include any token, card, chip or other instrument that utilizes the "Europay, Mastercard, and Visa" technical standard for electronic payments. By utilizing an EMV-type chip, the token may improve security against fraud when compared to obsolete magnetic stripe card transactions—information in these chips may be protected with personal identification numbers (PIN) and may be supplemented with cryptographic algorithms, such as Triple DES, RSA, and SHA, when providing secure information to a terminal. EMV chips may interface with antennae or coils in a way that enables NFC with payment terminals or other receivers of NFC information.

Figure 2:
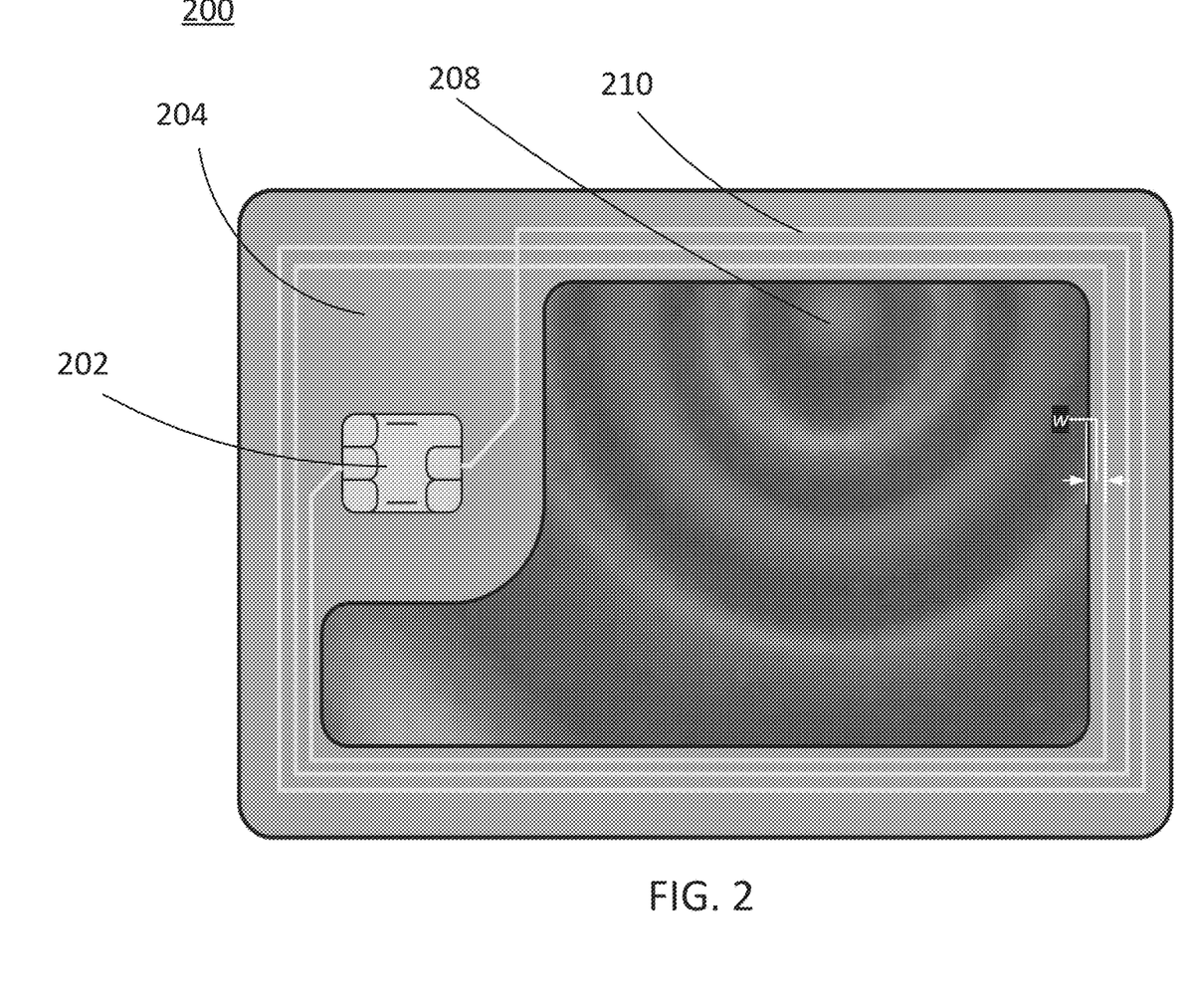
FIG. 2 shows an illustrative diagram for the visualization of magnetic field strength in a wireless token, in accordance with one or more embodiments.

FIG. 2 shows an illustrative diagram for the visualization of magnetic field strength in a wireless token, in accordance with one or more embodiments. Token 200 allows for the visualization of a magnetic signal emanating from an external source. The token includes a transparent window within radiofrequency communication antenna coils 210, on a card substrate 204, with a smart chip 202 attached to the card. The token allows for the visibility of electromagnetic field visualization display 208, which allows for a visualization of electric or magnetic fields. In the figure, it is clear that electromagnetic field visualization display 208 appears to form a concentric ring pattern in green and yellow off-center in relation to the card. Here, the center of the concentric rings may represent an area of higher electric or magnetic field density, for example near the center of an NFC transmitter from a point-of-sale terminal. For example, the electromagnetic field visualization display allows for a user to visualize the area of strongest magnetic field and, accordingly, adjust the card such that the coils are centered around the point of strongest field. Lateral distance w between radiofrequency communication antenna coil 210 and electromagnetic field visualization display 208, as discussed above, is shown in FIG. 2. This may allow a transaction that is enabled by NFC to be less noisy and more efficient, as the improved centering of the magnetic field about the antenna may enable stronger induction coupling, which in turn may reduce reading/writing errors between the token and the terminal.

The device may use or incorporate tokens. As referred to herein, a "token" may include any portable device or material that is capable of storing and/or processing data. In some embodiments, a token may include a card, such as an NFC card, wherein an integrated chip may contain or store information, such as information related to a transportation ticket, user or journey. In some embodiments, a card or a token may include an integrated chip, antenna coil, and/or a substrate. An integrated chip may contain or process information, such as transaction information. The integrated chip may take the form of an EMV chip or, for example, a chip that enables RFID or NFC communications, such as ePassports or transit passes. A substrate may be included in order to provide structural rigidity to the token; in some embodiments, the substrate may be incorporated with the other components of the token itself, such as the antenna. A token may, for example, be constructed from plastics, such as polyvinyl chloride, or metals, such as stainless steel. In some embodiments, the token may not be solid and/or may contain holes or transparent regions. By utilizing a token, many components may be combined to enable multiple functions, such as an NFC chip and an electromagnetic field visualization display, synergistically.

The device may use or incorporate an electromagnetic field visualization display. As referred to herein, an "electromagnetic field visualization display" may include any material, composition or substance that may react to an electric and/or magnetic field in a visualizable way. For example, an electromagnetic field visualization display may incorporate a material that may change colors in response to an applied magnetic field. In some embodiments, the electromagnetic field visualization display may substantially include the space within a transparent region in the token. In some embodiments, the token may incorporate a birefringent material whose refractive index changes with respect to an applied electric or magnetic field, such as a chiral nematic liquid crystal. In some embodiments, the token may incorporate a magnetic visualization medium that may react to an applied electric or magnetic field. The electromagnetic field visualization display itself may be an electromagnetic field visualization medium or material, in some embodiments. Additionally or alternatively, the electromagnetic field visualization medium or material may include a display and transparent region itself. The electromagnetic field visualization display may contain one or more polarizer films, which allow visible contrast upon a change in refractive index due to a change in an applied electric or magnetic field. In some embodiments, an electromagnetic field visualization display may include a magnetic visualization medium, such as magnetochromic nanoparticles. In some embodiments, the radiofrequency communication antenna may substantially surround the electromagnetic field visualization display in the plane of the token or its layers, as shown schematically in FIG. 2 (element 210 surrounds element 208). In some embodiments, the electromagnetic field visualization display may completely envelop or incorporate the radiocommunication antenna. By incorporating a display that is visually sensitive to magnetic or electric fields, the token allows a user to visualize these fields in a way that improves the interaction between the token and a terminal, such as an NFC card reader, which enables communications via electric or magnetic fields. For example, any discrepancy in alignment between the NFC antenna coil in the card and the communication coil in an NFC-enabled terminal may cause a decrease in signal strength of around 1.8 dBm per degree of misalignment in the plane of the card. The user may, as a result of this electromagnetic field visualization display, physically reorient or relocate the token in a way that maximizes the interaction between the token and the device, allowing for more efficient transactions.

The device may use or incorporate a polarizer film. As referred to herein, a polarizer film (or a polarizer) may be any material, medium, or substance that acts as an optical filter for polarized light. For example, a polarizer film may be a film that filters a beam of light of undefined or mixed polarization into a beam of well-defined polarization (i.e., polarized light). A polarizer may filter light into a linearly polarized state or a circularly polarized state. A polarizer film may also act to filter previously polarized light, such as light that has passed through another polarizer film. In some embodiments, this second polarizer film may be a linear polarizer, rotated in-plane by 90° with respect to the first polarizer. In this case, any light that passed through the first polarizer may be polarized to a particular linear polarization. The light may pass through the electromagnetic field visualization display medium, which may rotate or alter the polarization of this light. Subsequently, upon passing through a second linear polarizer, rotated by 90° from the first linear polarizer, some light may pass through depending on how much the field visualization medium altered the light's original polarization. This process allows for contrast depending on the electromagnetic field visualization display's optical configuration (e.g., its refractive index). If the electromagnetic field visualization display's refractive index reacts to an electric or magnetic field, then the contrast of light leaving the display will, as a result, also be dependent on the electric or magnetic field, allowing for the electromagnetic field visualization display to operate. Thus, using one or more polarizer films allows birefringent materials to act as electromagnetic field visualization display materials. As a result, the token may allow a user to visualize, for example, NFC fields from an NFC-enabled terminal.

The device may use or incorporate a chiral nematic liquid crystal. As referred to herein, a chiral nematic liquid crystal may refer to a material with properties between those of a conventional liquid and those of a solid crystal, and with chiral molecules or components, in a "thread-like" fashion. For example, chiral nematic liquid crystals may include materials such as cyanobiphenyls, whereby in certain temperature ranges and applied conditions, molecules may align in a thread-like (i.e., nematic) fashion, thereby creating a liquid crystal. By leveraging chirality in the material, the chiral nematic liquid crystal may become optically active; in other words, the material may allow for the rotation of light's polarization either to the right (e.g., in a dextrorotary material) or to the left (e.g., in a levorotary material). A chiral nematic liquid crystal may react to an alternating-current (AC) or a direct-current (DC) magnetic or electric field. In some embodiments, a chiral nematic liquid crystal exhibits a response spectrum to an AC electric or magnetic field. For example, the chiral nematic liquid crystal may exhibit a resonance at or over a particular frequency or range of frequencies of an AC magnetic or electric field. In some embodiments, this frequency at resonance may correspond to a frequency similar to a frequency corresponding to an antenna in the token. By exhibiting a sensitivity to particular frequencies, such as the frequency of operation of NFC terminals and devices, the token may allow for visualization of only electric or magnetic fields that are relevant to the user, and may block out other irrelevant confounding signals; by doing so, the token may reduce noise in the visualization display.

The electromagnetic field visualization display may use or incorporate a resonance. As referred to herein, a resonance may refer to a state where the system exhibits a strong response to one or more frequencies in comparison to other frequencies. For example, the electromagnetic field visualization display may leverage a material, such as a chiral nematic liquid crystal, that exhibits a response at a particular frequency of incident electric or magnetic fields, which may be considered to be a resonance. A frequency corresponding to this response may be known as a "resonant frequency." By utilizing a material that possesses a resonance at a particular frequency, the token may visualize only frequencies that are relevant to the use of the device. For example, an NFC card could utilize a material that responds strongly to NFC operation frequencies from an NFC-enabled terminal (i.e., at a frequency of 13.56 megahertz), such that the display does not visualize noise or background electromagnetic radiation that corresponds to different frequencies. Thus, the visualization display may visualize only those fields and terminals that are of relevance to the use of the token.

The device may use or incorporate a magnetic visualization medium. As referred to herein, a magnetic visualization medium may include a medium that contains magnetic elements, such as magnetic nanoparticles, that allow for visualization of magnetic fields. For example, a magnetic visualization medium may include iron filings suspended in a liquid, whereby iron filings are free to move to react to applied magnetic fields. In some embodiments, a magnetic visualization medium may include magnetochromic nanoparticles, or any other magnetic material or metamaterial that may cause a response to an applied electromagnetic or magnetic field. By utilizing a magnetic visualization medium, the token may leverage a material that interacts with incident magnetic fields, such as that emanating from an NFC terminal, in order to visualize the field strength and, subsequently, to allow a user to reposition the token to maximize any inter-device magnetic or electric communications.

The device may use or incorporate magnetochromic nanoparticles. As referred to herein, magnetochromic nanoparticles may include any nanometer- to micrometer-scaled particles that are magnetic and that may exhibit a sensitivity to a magnetic field that results in a change in color. For example, these materials may include mixed metal compounds, such as $K_2V_3O_8$ or $Li_{0.8}Mo_6O_{17}$, and/or related mixed oxides. Colloidal $Fe_3O_4$ nanoparticles suspended in aqueous solutions, with diameters of an order of magnitude around 10 nanometers, may change color in response to a magnetic field as well. As NFC terminals work through magnetic induction, tokens that include magnetochromic nanoparticles may be able to react to the applied magnetic field from the terminal and may thus change color. This process allows the token to visualize magnetic fields in the vicinity of the card, allowing a user to best position the token with respect to, for example, card readers.

The device may use or incorporate a radiofrequency communication antenna. As referred to herein, "radiofrequency communication antennae" may refer to a device that acts as an interface between radio waves, electromagnetic waves, or magnetic signals and electric currents moving in metal conductors that allows for communication. For example, a radiofrequency communication antenna may include an antenna configured for receiving NFC terminal magnetic communications. In some embodiments, the radiofrequency communication antenna may include a tuned resonant circuit, which may be a circuit configured to receiving signals only of particular bands of frequencies. For example, the radiofrequency communication antenna may connect to a capacitor in a way that creates a filter for frequencies in the antenna's electrical circuit. The radiofrequency communication antenna may interface with a smart chip, such as an EMV chip, through a connection with the chip's terminals, as shown in FIG. 2. By incorporating a radiofrequency communication antenna, the token may interact with, for example, NFC-enabled terminals, whereby the terminals may send information, signals, and other communications to the token via the radiofrequency communication antenna. The electromagnetic field visualization display may, subsequently, visualize the strength of this communication through its visualization of electric or magnetic fields adjacent to the token.

The device may use or incorporate a tuned resonant circuit. A "tuned resonant circuit" may include a circuit that acts as an electrical resonator. The tuned resonant circuit may include an inductor and/or a capacitor, whereby the circuit may generate or be sensitive to electrical signals at particular frequencies. In some embodiments, the tuned resonant circuit may be tuned to a particular frequency corresponding to signals that are relevant. The frequency of operation of the token, including the tuned resonant circuit and/or the radiofrequency communication antenna may be referred to as a "frequency of operation." For example, the tuned resonant circuit may be configured to a frequency corresponding to NFC, such as 13.56 megahertz, which may be considered a frequency of operation. The tuned resonant circuit may connect to or be a part of the radiofrequency communication antenna. The tuned resonant circuit may also connect to, be a part of, or include the NFC chip. The tuned resonant circuit may be used to filter out electrical or magnetic signals that do not correspond to, for example, NFC signals and, thus, allow the token to operate free of background noise from other signals.

The device may use or incorporate a transparent region. A "transparent region" may include a region in the construction of the token wherein visible light is able to pass through without obstruction, as shown illustratively in FIG. 1A (component 106). A transparent region may sit adjacent to the electromagnetic field visualization display at a distance x as shown in FIG. 1A, where x may range from 0 to 10 mm (or, in some embodiments, 0 to 5 mm, 1 to 5 mm, 0 to 3 mm, 1 to 3 mm, or other ranges), and may, in some embodiments, encompass the entirety of a layer of the token. For example, a full layer of the token may be made of a transparent material. In some embodiments, the transparent region may be organized in a circularly symmetric fashion. As referred to herein, "circularly symmetric" may refer to any arrangement of space that preserves circular symmetry (i.e., the space may be rotated by an arbitrary angle and map onto itself). A transparent region allows the magnetic- or electric field dependent electromagnetic field visualization display to be visible to a user during operation, allowing a user to determine the optimal position for the token during use. A circularly symmetric transparent region would allow better visual confirmation of a position corresponding to the strongest magnetic field, as it allows for the center of the maximum signal to be highlighted on the display; a maximum signal would yield a display where the visualization pattern is equidistant from the edges of the circularly symmetric transparent region, allowing for easier visual confirmation.

The manufacture of the device may utilize bonding. Bonding may include a process that allows for connection or joining of components. Bonding may, for example, include adhesion as a result from heat, pressure, or chemical bonds. For example, a token may be created by constructing various layers and bonding them together through extrusion, such as on a casting roller. By bonding various layers together, the various components discussed above may be linked in an operative manner, such that the display, antenna, and smart chip, for example, may work together in the same space.

Figure 3:
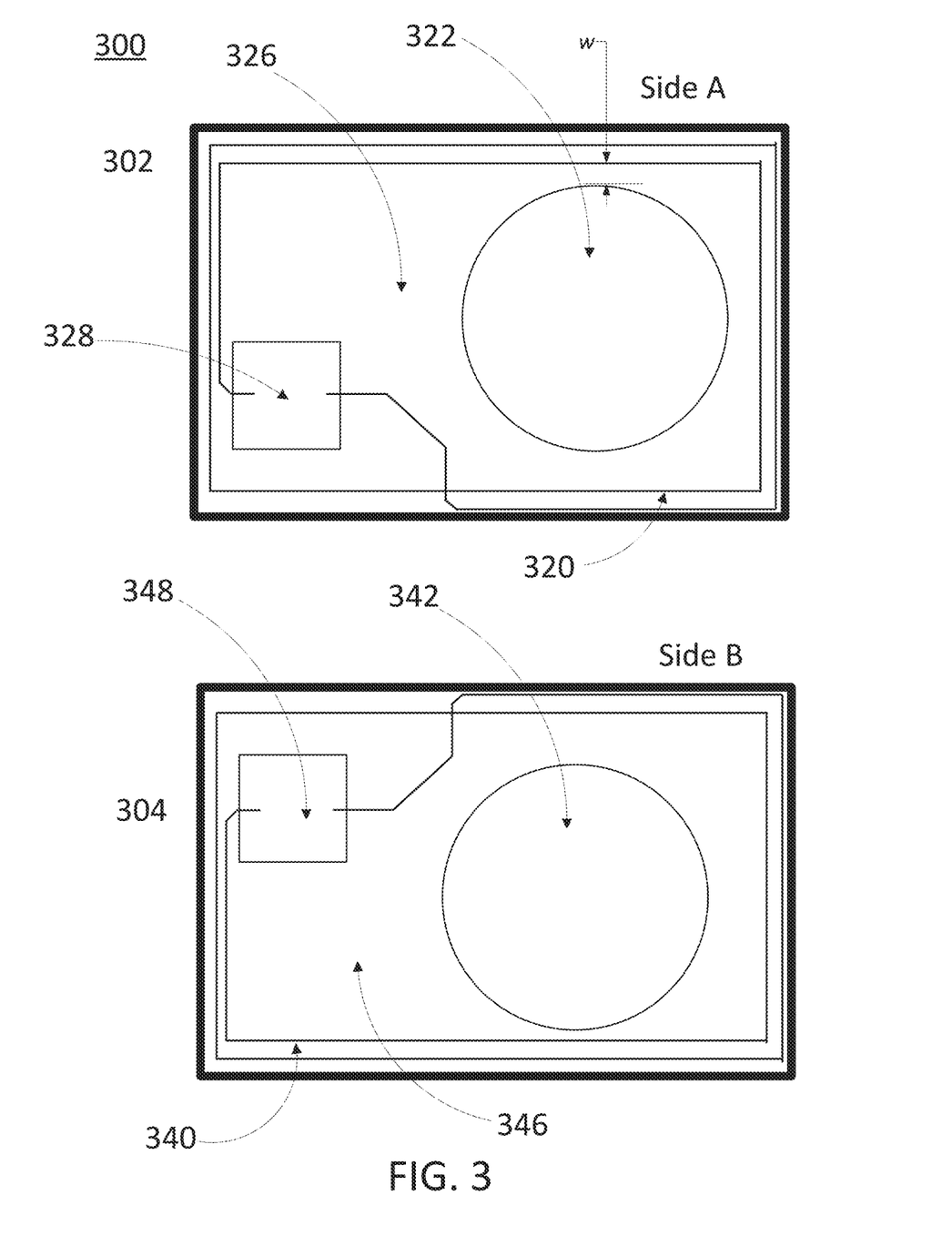
FIG. 3 shows an illustrative diagram for a wireless card configured to provide visualizations of electromagnetic fields on multiple sides, in accordance with one or more embodiments.

FIG. 3 shows an illustrative diagram for a wireless card configured to provide visualizations of electromagnetic fields on multiple sides, in accordance with one or more embodiments. For example, the token may exhibit a Side A (view 302) and a Side B (view 304), as shown on FIG. 3. Sides A and B may have their own EMV-enabled chip, such as chip 328 and 348, respectively, and corresponding NFC-enabled antennae 320 and 340, respectively. Additionally, each side may include its own transparent region (e.g., region 322 for Side A and region 342 for Side B). Transparent regions 322 and 342 may allow visualization of either the same electromagnetic field visualization display or medium, or different electromagnetic field visualization displays or media. The transparent regions 322 and 342 may be incorporated within opaque or translucent regions 326 or 346 respectively, or the transparent regions may extend to cover the entirety of regions 322 and 326 on Side A or the entirety of regions 342 and 346 on Side B. Note that the placement of EMV chips 328 and 348 may be shifted relative to those placements shown in FIG. 3. By allowing multiple sides of both visualization and chip placement, the token allows for multi-chip applications, where more than one chip, with more than one feature, may be incorporated within. Lateral distance w between the electromagnetic field visualization display viewable through transparent region 322 and the NFC coil, as discussed in relation to FIG. 1B and FIG. 2, is shown as well. Note that distance w may be measured in any direction in the plane of the token. Additionally, regardless of the orientation of the card, a user may be able to take advantage of the card's electromagnetic field visualization features, which enables a user to position a card with respect to an NFC-enabled terminal when using either side of the card.

Figure 4:
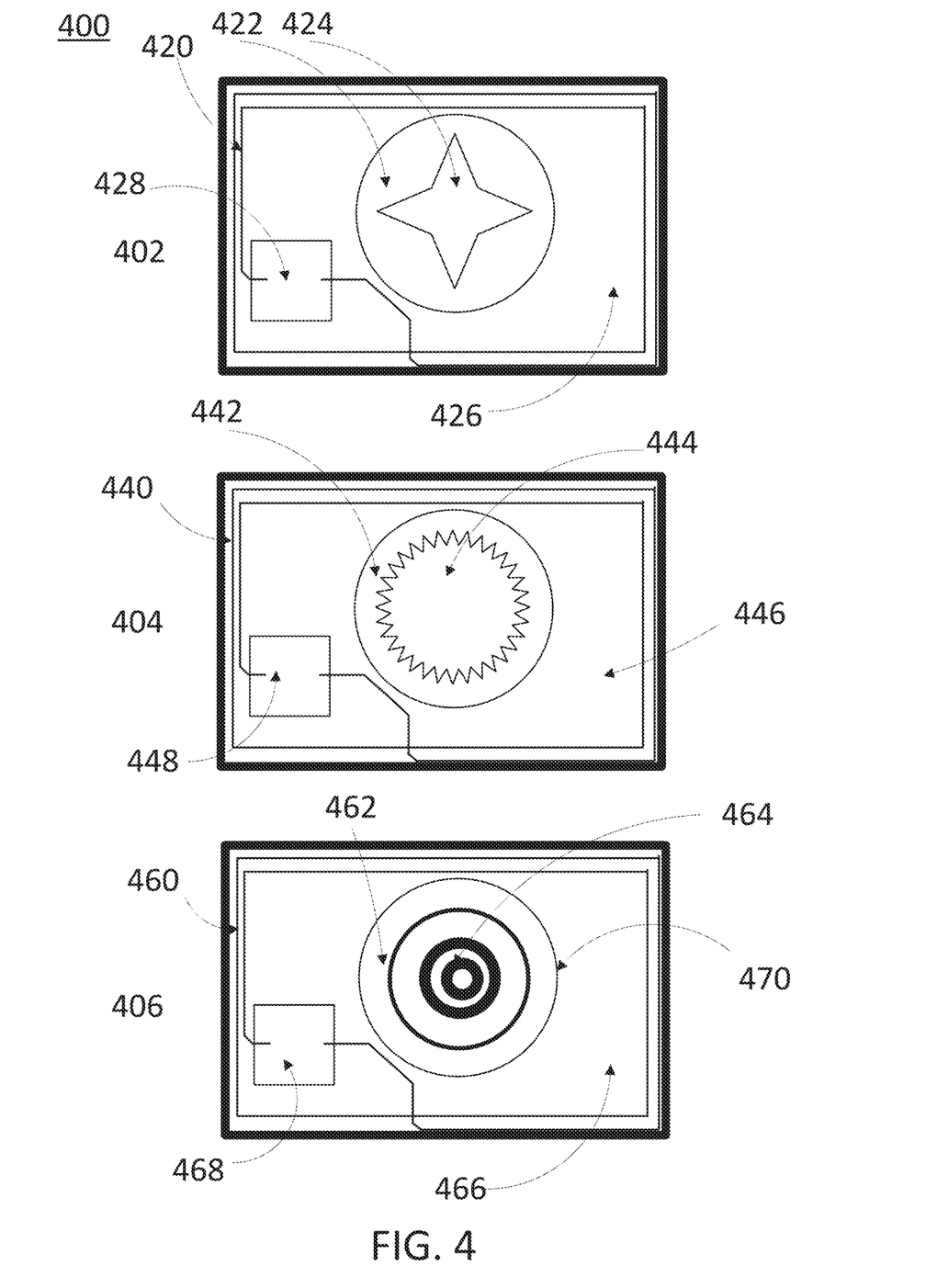
FIG. 4 shows an illustrative diagram for electromagnetic visualizations appearing in a visualization display of a wireless card, in accordance with one or more embodiments.

FIG. 4 shows an illustrative diagram for electromagnetic visualizations appearing in a visualization display of a wireless card, in accordance with one or more embodiments. For example, FIG. 4 demonstrates sample visualizations on electromagnetic field visualization displays (e.g., displays 422, 442, and 462, respectively, for tokens 402, 404, and 406). As shown illustratively in FIG. 4, each token displayed further exhibits an antenna 420, 440, or 460, respectively, a layer 426, 446, or 466 containing the displays, and an NFC chip 428, 448, or 468.

For example, token 402, 404, and 406 may demonstrate patterns 424, 444, or 464 appearing on electromagnetic field visualization displays 422, 442, and 462. A point-of-sale terminal, or any other NFC-enabled terminal, may transmit magnetic signals that may cause a star visualization, as in 424, depending on the geometry of the magnetic signal generation in the terminal. In some cases, this visualization, as shown in token 404, may be a rough, ragged pattern roughly showing a wide region of high field, as in visualization 444. However, in other cases, the visualization may appear as a bulls-eye, as in token 406 and visualization 464, with a clearly visible maximum visualization (and, therefore, maximum field strength). In some cases, if this maximum is circularly symmetric, as shown in token 406, a circularly symmetric transparent region (i.e., a region represented by circle 470) may allow for an improvement in centering the token over the maximum signal area, as the circular region clearly frames how far a circularly symmetric visualization pattern lies from the center of the visualization window.

Figure 5:
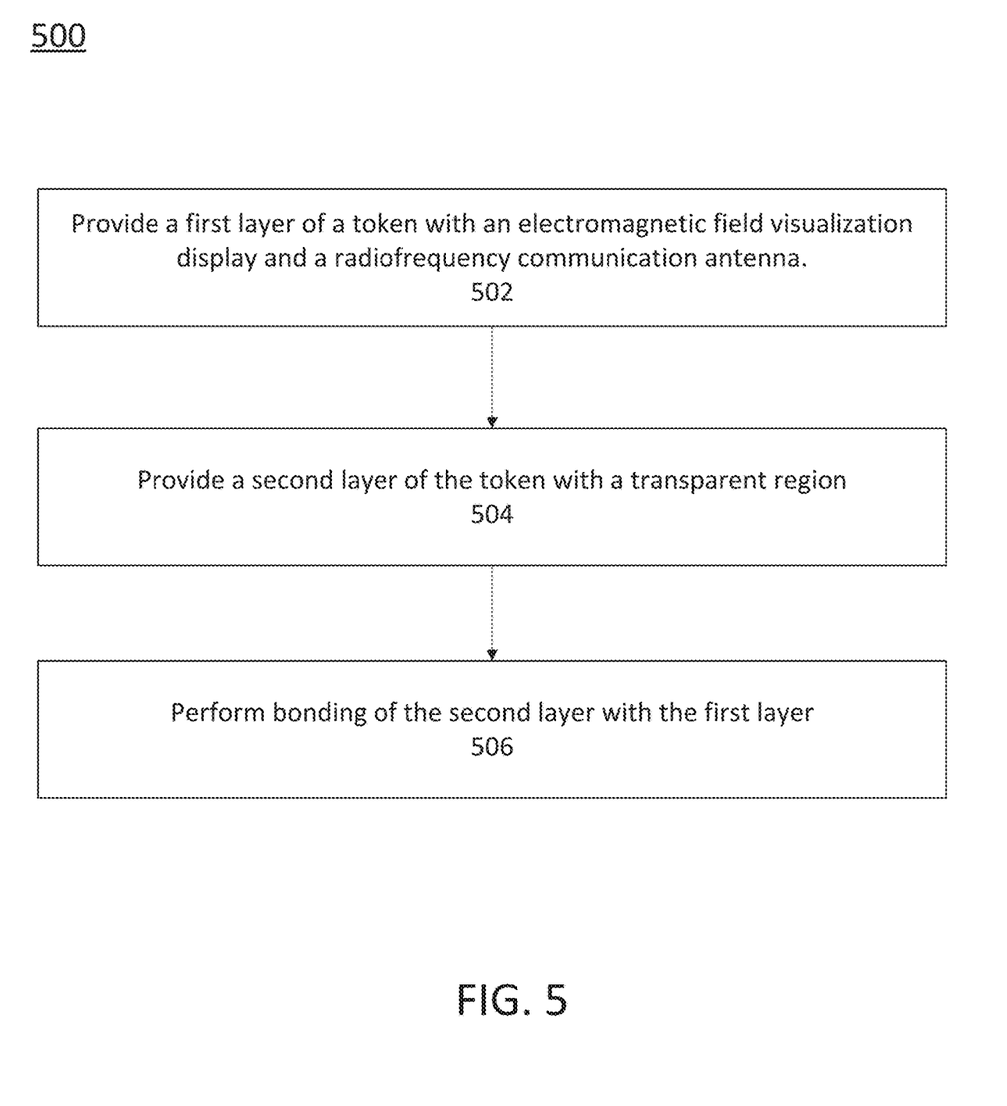
FIG. 5 shows an illustrative flowchart for a process for constructing a token configured to provide visualization of electromagnetic fields, in accordance with one or more embodiments.

FIG. 5 shows a flowchart of the steps involved in manufacturing a token with an electromagnetic field strength visualization display, in accordance with one or more embodiments. For example, the token may include a near-field communication card with an NFC-field-strength visualization display and a transparent window through which the NFC-field-strength visualization display is visible.

At step 502, process 500 (e.g., using one or more components described above) may confer the token an electromagnetic field visualization display and a radiofrequency communication antenna. For example, the token may include a first layer, the first layer including an electromagnetic field visualization display and a radiofrequency communication antenna. In some embodiments, the electromagnetic field visualization display and radiofrequency communication antenna may not be incorporated in the first layer or any layer at all, or may be incorporated in another layer. For example, the token may include an electromagnetic field visualization display, such as a chiral nematic liquid crystal that reacts to electric or magnetic signals, and may also include a radiofrequency communication antenna, such as one that is configured to receive NFC-frequency signals. By doing so, the system may allow for the receipt, transmission, and visualization of electric or magnetic signals from devices that interact with the token. By incorporating the antenna and the electromagnetic field visualization display on the same layer, the electrical or magnetic fields that are relevant to the operation of the antenna may be most accurately represented through the visualization display, as both elements are adjacent to each other in the same layer.

In some embodiments, the radiofrequency communication antenna may include a tuned resonant circuit. The radiofrequency communication antenna may include a tuned resonant circuit that operates at a first resonant frequency. For example, the radiofrequency communication antenna may be configured, through an inductor-capacitor circuit, to be sensitive to a "resonant frequency," at the expense of other frequencies. By doing so, the token may only be sensitive to frequencies of external electromagnetic radiation that are relevant to the operation of one or more components of the token (e.g., an EMV chip incorporated in the token). As an example, an NFC terminal may transmit signals at a particular frequency. By including a tuned resonant circuit, the token may be sensitive only to the NFC terminal's signals (e.g., by filtering out other signals that may interfere). In some embodiments, the electromagnetic field visualization display may also exhibit a resonance. The electromagnetic field visualization display may exhibit a resonance corresponding to the first resonant frequency. For example, the electromagnetic field visualization display may include a material that is particularly sensitive to a frequency that corresponds to the resonant frequency of the token's tuned resonant circuit. This feature allows the token to visualize only fields that are relevant to the operation of the token. Thus, by tuning the resonance of the electromagnetic field visualization display to that of the tuned resonant circuit corresponding to the radiofrequency communication antenna, the token may ensure that only, for example, NFC signals are visualized, which limits the interference and noise that may be visualized on the electromagnetic field visualization display.

In some embodiments, the electromagnetic field visualization display may include a chiral nematic liquid crystal. For example, the electromagnetic field visualization display may contain a liquid crystal, such as CPC (chiral pyridine compound), wherein the liquid crystal is sensitive to electric or magnetic fields, and exhibits a refractive index that is electric- or magnetic-field dependent, and is optically active (i.e., is chiral, so that it may allow for rotations of incident polarized light). A chiral nematic liquid crystal may react to an AC or DC magnetic or electric field. In some embodiments, a chiral nematic liquid crystal exhibits a response spectrum to an AC electric or magnetic field. For example, the chiral nematic liquid crystal may exhibit a resonance at or over a particular frequency or range of frequencies of an AC magnetic or electric field. In some embodiments, this frequency at resonance may correspond to a frequency similar to a frequency corresponding to an antenna in the token. By exhibiting a sensitivity to particular frequencies, such as the frequency of operation of NFC terminals and devices, the token may allow for visualization of only electric or magnetic fields that are relevant to the user, and may block out other irrelevant confounding signals; by doing so, the token may reduce noise in the visualization display.

In some embodiments, the electromagnetic field visualization display may include a magnetic visualization medium. For example, a magnetic visualization medium may include iron filings suspended in a liquid, whereby iron filings are free to move to react to applied magnetic fields. In some embodiments, a magnetic visualization medium may include magnetochromic nanoparticles, or any other magnetic material or metamaterial that may cause a response to an applied electromagnetic or magnetic field. By utilizing a magnetic visualization medium, the token may leverage a material that interacts with incident magnetic fields, such as that emanating from an NFC terminal, in order to visualize the field strength and, subsequently, to allow a user to reposition the token to maximize any inter-device magnetic or electric communications.

In some embodiments, the radiofrequency communication antenna may surround the visualization display. The radiofrequency communication antenna may substantially surround the electromagnetic field visualization display with respect to one or more axes. For example, as shown in FIG. 2, antenna 210 may surround visualization display 208 in the plane of the token. By sitting within the radiofrequency communication antenna's reach, the electromagnetic field visualization display may be positioned to more effectively capture the electromagnetic fields that reach the antenna. By doing so, the electromagnetic field visualization display may provide a more accurate assessment of the electric or magnetic field strength felt by the antenna and may, as a result, improve the user's indication of the optimal position for maximizing the token's field strength at a terminal, for example an NFC terminal.

In some embodiments, the magnetic visualization medium may include magnetochromic nanoparticles suspended in a liquid. As NFC terminals work through magnetic induction, tokens that include magnetochromic nanoparticles may be able to react to the applied magnetic field from the terminal and may thus change color in response. This process allows the token to visualize magnetic fields in the vicinity of the card, allowing a user to best position the token with respect to, for example, card readers.

In some embodiments, the electromagnetic field visualization display may include a first polarizer film and a second polarizer film, with an electromagnetic field visualization material in between. The electromagnetic field visualization display may include an electromagnetic field visualization material, a first polarizer film, and a second polarizer film, wherein the electromagnetic field visualization material sits between the first polarizer film and the second polarizer film. This process allows for contrast depending on the electromagnetic field visualization display's optical configuration (e.g., its refractive index). If the electromagnetic field visualization display's refractive index reacts to an electric or magnetic field, then the contrast of light leaving the display will, as a result, also be dependent on the electric or magnetic field, allowing for the electromagnetic field visualization display to operate. Thus, using one or more polarizer films allows birefringent materials to act as electromagnetic field visualization display materials. As a result, the token may allow a user to visualize, for example, NFC fields from an NFC-enabled terminal.

At step 504, process 500 (e.g., using one or more components described above) may include providing a transparent region. The token may include a second layer, the second layer including a first transparent region. For example, the second layer may include a hole with a transparent filling. In some embodiments, the transparent region may be incorporated into the electromagnetic field visualization display or electromagnetic field visualization medium itself. The transparent region may be within the second layer of the token or may be incorporated into another layer or part of the token. By including a transparent region, the electromagnetic field visualization display may be visible through the entire token, allowing for any pattern of magnetic or electric fields that manifest to be visible to a user of the token.

In some embodiments, the first transparent region has a shape that is circularly symmetric. For example, a shape of the first transparent region may be circularly symmetric. In this case, the transparent region acts as a visual guide for a user, as a circularly symmetric transparent region may frame a circularly symmetric pattern associated with a region in space of highest magnetic or electric field. A circularly symmetric transparent region would allow better visual confirmation of a position corresponding to the strongest magnetic field, as it allows for the center of the maximum signal to be highlighted on the display; a maximum signal would yield a display where the visualization pattern is equidistant from the edges of the circularly symmetric transparent region, allowing for easier visual confirmation.

At step 506, process 500 (e.g., using one or more components described above) may include performing bonding of the second layer and the first layer. The manufacture of the token may include performing bonding of the second layer and the first layer, such that the electromagnetic field visualization display of the first layer is visible through the first transparent region of the second layer. For example, a token may be created by constructing various layers and bonding them together through extrusion, such as on a casting roller. By bonding various layers together, the various components discussed above may be linked in an operative manner, such that the display, antenna, and smart chip, for example, may work together in the same space.

In some embodiments, the second layer may include a top graphics layer. The second layer may include a top graphics layer including graphics and a transparent region through which the electromagnetic field visualization display is visible. For example, the top layer may contain logos, visual cues or other visual aids and simultaneously allow for visualization of the electromagnetic field visualization display. These logos may aid in interpreting the pattern generated from the electromagnetic field visualization display, for example, and allows a user to more accurately position the token adjacent to a token reader.

In some embodiments, the method may further include providing a third layer and performing a bonding operation of the third layer with the first layer or the second layer. For example, the token may include, opposite the second layer including the first transparent region, a third layer including a second transparent region, wherein the first transparent region and the second transparent region have a substantially similar shape, and providing bonding of the third layer with the first layer or the second layer such that the electromagnetic field visualization display of the first layer is visible through both the first transparent region of the second layer and the second transparent region of the third layer. For example, the token may include a third "substrate" layer that still allows for visualization of the electromagnetic field visualization display, but also improves the rigidity and durability of the card or token. The third layer may also help to protect any electronic components within the token from external degradation.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

A1. A method comprising: providing a first layer of a token, the first layer comprising an electromagnetic field visualization display and a radiofrequency communication antenna; providing a second layer of the token, the second layer comprising a first transparent region; and performing bonding of the second layer and the first layer such that the electromagnetic field visualization display of the first layer is visible through the first transparent region of the second layer.

A2. The method of any one of the preceding embodiments, wherein the radiofrequency communication antenna comprises a tuned resonant circuit that operates at a first resonant frequency.

A3. The method of any one of the preceding embodiments, wherein the electromagnetic field visualization display exhibits a resonance corresponding to the first resonant frequency.

A4. The method of any one of the preceding embodiments, wherein the electromagnetic field visualization display comprises a chiral nematic liquid crystal.

A5. The method of any one of the preceding embodiments, wherein the electromagnetic field visualization display comprises a magnetic visualization medium.

A6. The method of any one of the preceding embodiments, wherein the radiofrequency communication antenna substantially surrounds the electromagnetic field visualization display on the first layer.

A7. The method of any one of the preceding embodiments, further comprising: providing, opposite the second layer comprising the first transparent region, a third layer comprising a second transparent region, wherein the first transparent region and the second transparent region have a substantially similar shape; and performing bonding of the third layer with the first layer or the second layer such that the electromagnetic field visualization display of the first layer is visible through both the first transparent region of the second layer and the second transparent region of the third layer.

A8. The method of any one of the preceding embodiments, wherein the magnetic visualization medium comprises magnetochromic nanoparticles suspended in a liquid.

A9. The method of any one of the preceding embodiments, wherein a shape of the first transparent region is circularly symmetric.

A10. The method of any one of the preceding embodiments, wherein the electromagnetic field visualization display of the first layer comprises an electromagnetic field visualization material, a first polarizer film, and a second polarizer film, and wherein the electromagnetic field visualization material sits between the first polarizer film and the second polarizer film.

A11. A token produced using the method of any of embodiments A1-A10.

A12. A system comprising means for performing any of embodiments A1-A10.

B1. A token comprising: an electromagnetic field visualization layer; a radiofrequency communication antenna; and a first transparent region comprising a transparent surface through which the electromagnetic field visualization display is visible.

B2. The token of any one of the preceding embodiments, wherein the radiofrequency communication antenna comprises a tuned resonant circuit configured to operate at a first resonant frequency, and wherein the electromagnetic field visualization display is configured for a resonance corresponding to the first resonant frequency.

B3. The token of any one of the preceding embodiments, wherein a surface of the radiofrequency communication antenna is within three millimeters of a surface of the electromagnetic field visualization display.

B4. The token of any one of the preceding embodiments, wherein the electromagnetic field visualization display comprises a chiral nematic liquid crystal.

B5. The token of any one of the preceding embodiments, wherein the electromagnetic field visualization display comprises a magnetic visualization medium.

B6. The token of any one of the preceding embodiments, wherein the radiofrequency communication antenna substantially surrounds the electromagnetic field visualization display with respect to one or more axes.

B7. The token of any one of the preceding embodiments, wherein the magnetic visualization medium comprises magnetochromic nanoparticles suspended in a liquid.

B8. The token of any one of the preceding embodiments, wherein a shape of the first transparent region is circularly symmetric.

B9. The token of any one of the preceding embodiments, wherein the electromagnetic field visualization display comprises an electromagnetic field visualization material, a first polarizer film, and a second polarizer film, and wherein the electromagnetic field visualization material sits between the first polarizer film and the second polarizer film.

What is claimed is:

1. A near-field communication (NFC) card for visualizing an NFC field, the NFC card comprising:
a middle layer comprising:
an electromagnetic field visualization display comprising a liquid electromagnetic field-sensitive material, wherein properties of the liquid electromagnetic field-sensitive material comprise a first resonant frequency corresponding to a frequency of operation and not do not comprise a resonant frequency at one or more frequencies outside a range of the frequency of operation; and
a radiofrequency communication antenna (i) not in electrically conductive contact with the liquid electromagnetic field-sensitive material, (ii) surrounding substantially all perimeters of the electromagnetic field visualization display on two or more axes, and (iii) tuned to the frequency of operation; and
a top graphics layer adjacent to a top of the middle layer comprising graphics and a top transparent region through which the electromagnetic field visualization display is visible.

2. A method comprising:
providing a first layer of a token, the first layer comprising an electromagnetic field visualization display and a radiofrequency communication antenna, wherein:
the radiofrequency communication antenna is tuned to a frequency of operation;
the electromagnetic field visualization display comprises a liquid electromagnetic field-sensitive material not in electrically conductive contact with the radiofrequency communication antenna, and
properties of the liquid electromagnetic field-sensitive material comprise a first resonant frequency corresponding to the frequency of operation;
providing a second layer of the token, the second layer comprising a first transparent region; and
performing bonding of the second layer and the first layer such that the electromagnetic field visualization display of the first layer is visible through the first transparent region of the second layer.

3. The method of claim 2, wherein the radiofrequency communication antenna comprises a tuned resonant circuit that operates at the frequency of operation.

4. The method of claim 2, wherein the liquid electromagnetic field-sensitive material comprises a chiral nematic liquid crystal.

5. The method of claim 2, wherein the liquid electromagnetic field-sensitive material comprises suspended iron filings.

6. The method of claim 5, wherein the liquid electromagnetic field-sensitive material comprises suspended magnetochromic nanoparticles.

7. The method of claim 2, further comprising:
providing, opposite the second layer comprising the first transparent region, a third layer comprising a second transparent region, wherein the first transparent region and the second transparent region have a substantially similar shape; and
performing bonding of the third layer with the first layer or the second layer such that the electromagnetic field visualization display of the first layer is visible through both the first transparent region of the second layer and the second transparent region of the third layer.

8. The method of claim 2, wherein a shape of the first transparent region is circularly symmetric.

9. The method of claim 2, wherein the electromagnetic field visualization display of the first layer comprises a first polarizer film and a second polarizer film, and wherein the liquid electromagnetic field-sensitive material sits between the first polarizer film and the second polarizer film.

10. A token comprising:
- an electromagnetic field visualization display comprising a liquid electromagnetic field-sensitive material, wherein properties of the liquid electromagnetic field-sensitive material comprise a resonant frequency corresponding to a frequency of operation;
- a radiofrequency communication antenna that is tuned to the frequency of operation and not in electrically conductive contact with the liquid electromagnetic field-sensitive material; and
- a transparent region comprising a transparent surface through which the electromagnetic field visualization display is visible.

11. The token of claim 10, wherein the radiofrequency communication antenna comprises a tuned resonant circuit configured to operate at the frequency of operation.

12. The token of claim 11, wherein a surface of the radiofrequency communication antenna is within three millimeters of a surface of the electromagnetic field visualization display.

13. The token of claim 10, wherein the liquid electromagnetic field-sensitive material comprises a chiral nematic liquid crystal.

14. The token of claim 10, wherein the liquid electromagnetic field-sensitive material comprises suspended iron filings.

15. The token of claim 10, wherein the radiofrequency communication antenna substantially surrounds the electromagnetic field visualization display with respect to one or more axes, and wherein at least three edges of the electromagnetic field visualization display are within ten millimeters of the radiofrequency communication antenna.

16. The token of claim 14, wherein the liquid electromagnetic field-sensitive material comprises suspended magnetochromic nanoparticles.

17. The token of claim 10, wherein a shape of the transparent region is circularly symmetric.

18. The token of claim 10, wherein the electromagnetic field visualization display comprises a first polarizer film and a second polarizer film, and wherein the liquid electromagnetic field-sensitive material sits between the first polarizer film and the second polarizer film.

19. The NFC card of claim 1, wherein the liquid electromagnetic field-sensitive material comprises chiral nematic liquid crystal, magnetochromic nanoparticles, or iron filings.

20. The NFC card of claim 1, wherein the electromagnetic field visualization display and the top transparent region form a transparent card portion that is transparent from both a bottom of the middle layer and a top of the top transparent region.

\* \* \* \* \*